US008671179B2

(12) United States Patent
Altaf et al.

(10) Patent No.: US 8,671,179 B2
(45) Date of Patent: Mar. 11, 2014

(54) DYNAMICALLY ADDING BEST SUITED SERVERS INTO CLUSTERS OF APPLICATION SERVERS

(75) Inventors: Faheem Altaf, Pflugerville, TX (US); Dharmesh Bhakta, Austin, TX (US); Michael Brown, Austin, TX (US); Kumar Ravi, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 11/764,903

(22) Filed: Jun. 19, 2007

(65) Prior Publication Data

US 2008/0320121 A1 Dec. 25, 2008

(51) Int. Cl.
*G06F 15/16* (2006.01)

(52) U.S. Cl.
USPC ............ 709/224; 709/230; 709/239; 718/105

(58) Field of Classification Search
USPC ................... 709/230, 224, 223, 239; 718/105
See application file for complete search history.

(56) References Cited

U.S. PATENT DOCUMENTS 6,965,930 B1 * 11/2005 Arrowood et al. ............ 709/223

OTHER PUBLICATIONS

Giorgia Lodi, Middleware Services for Dynamic Clustering of Application Servers (Ph.D. Thesis), Mar. 2006, 1-99 http://www.cs.unibo.it/pub/TR/UBLCS/2006/2006-06.pdf.*
Arora, Tej and DAS, Saumitra, Graceful distribution in application server load balancing, Feb. 22, 2001, PCT: International Publication No. WO 01/13228 A2, 1-78.*
Labourey et al., "JBoss AS Clustering," 7th Edition, JBoss, Inc., May 21, 2004.

* cited by examiner

*Primary Examiner* — El Hadji Sall
(74) *Attorney, Agent, or Firm* — John D. Flynn; Gregory K. Goshorn; Greg Goshorn, P.C.

(57) ABSTRACT

A system, computer program product and computer-implemented method of dynamically adding a best suited application server to a cluster of application servers are provided. To do so, a history of quality of service (QoS) of a plurality of application servers is maintained. Using the history of QoS, an application server is dynamically selected and added to the cluster when the cluster is under a heavy workload. The selected application server is one that has the most historically favorable QoS and a heavy workload is one that exceeds a user-configurable threshold.

17 Claims, 9 Drawing Sheets

| | PERFORMANCE LEVEL | SCALABILITY LEVEL | RELIABILITY | RANKING |
|---|---|---|---|---|
| $SERVER_2$ | 70% | YES | YES | 1 |
| $SERVER_1$ | 50% | YES | YES | 2 |
| $SERVER_3$ | 50% | NO | NO | 3 |
| | | | | |

FIG. 2

DYNAMICALLY ADDING BEST SUITED SERVERS INTO CLUSTERS OF APPLICATION SERVERS

BACKGROUND OF THE INVENTION

1. Technical Field

The present invention is generally directed to application servers. More specifically, the present invention is directed to a system, computer program product and method of dynamically adding a server best suited for a cluster of application servers into the cluster during periods of heavy workload.

2. Description of Related Art

An application server is a server on which a process that runs application servlets, JavaServer Pages, and/or Enterprise Java Beans (EJBs) executes. (Note that JavaServer Pages and EJBs are trademarks of Sun Microsystems, Inc.) The application server provides servlet runtime components and an EJB runtime container. An EJB container manages enterprise beans contained therein. The container is responsible for registering objects of a bean, providing a remote interface for the object, creating and destroying object instances, checking security for the object, managing the active state for the object, and coordinating distributed transactions.

An application server may undergo varying amounts of workload within a particular time span. To maintain performance during periods of heavy workloads, an administrator may make additional servers available through clustering. Clustering refers to grouping together a plurality of application servers to provide load balancing and failover support. Each application server in the cluster runs the same set of applications, and a deployment manager manages the whole cluster. To a user, the cluster appears to be a single application server.

One problem with clustering is that during periods of light workload, some of the servers in the cluster may become idle. Consequently, application servers such as WebSphere™ Application Server (WebSphere™ is a registered mark of International Business Machines Corporation (IBM) and WebSphere™ Application Server is a product of IBM) allow administrators to configure the servers in the cluster using policy-based dynamic allocation of resources (CPU, memory, database connections etc.). Policy-based dynamic allocation of resources enables servers that do not require a lot of resources during a particular timeframe to automatically be assigned fewer resources during that timeframe. However, the number of servers in the cluster remains constant.

Other application servers include an auto-discovery feature to allow a cluster to find a replacement server for an unresponsive server when the cluster is under a period of heavy workload. To find the replacement server, a request is sent to a pool of un-configured servers to join the cluster. The first server to respond to the request is used as the replacement server. However, just as in the case of the policy-based dynamic allocation of resources, the number of servers in the cluster remains constant.

Further, the replacement server may not always be a good choice. For example, servers do not perform well under all circumstances. Therefore, there may be circumstances under which the replacement server may not perform the task well. Nonetheless, even if the replacement server is performing the task well, it may not be available for an extended amount of time or may only have a certain number of CPU cycles to spare etc.

Thus, what is needed are a system, computer program product and method of dynamically adding a server into a cluster during periods of heavy workload. The added server, however, should be one that is best suited among any number of available servers to handle the workload.

SUMMARY OF THE INVENTION

The present invention provides a system, computer program product and computer-implemented method of dynamically adding a best suited application server to a cluster of application servers. To do so, a history of quality of service (QoS) of a plurality of application servers is maintained. Using the history of QoS, an application server on the network is dynamically selected and added to the cluster when the cluster is under a heavy workload.

In one embodiment of the invention, the application server is dynamically selected by broadcasting a request to the application servers for an application server that is able to donate a number of processor cycles for an amount of time to the cluster to respond to the request. When two or more application severs respond to the request within a particular time frame, the application server with the most favorable history of QoS is selected. If none of the application servers that respond to the request has a history of QoS, the first application server to respond within the particular time frame is added to the cluster.

In another embodiment of the invention, the workload is considered heavy when it exceeds a user-configurable threshold. When the workload no longer exceeds the user-configurable threshold and if the added application server is not performing a task for the cluster, the added application server is released from the cluster. After releasing the added application server from the cluster, the history of QoS of the added application server is updated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1(*b*) depicts the cluster of FIG. 1(*a*) with an additional server added thereto.

FIG. 1(*c*) depicts exemplary servers with listening agents.

FIG. 2 illustrates an exemplary table in which additional resources cross-referenced with their quality of service are stored.

DETAILED DESCRIPTION OF THE PREFERRED EMBODIMENT

Figure 1A:
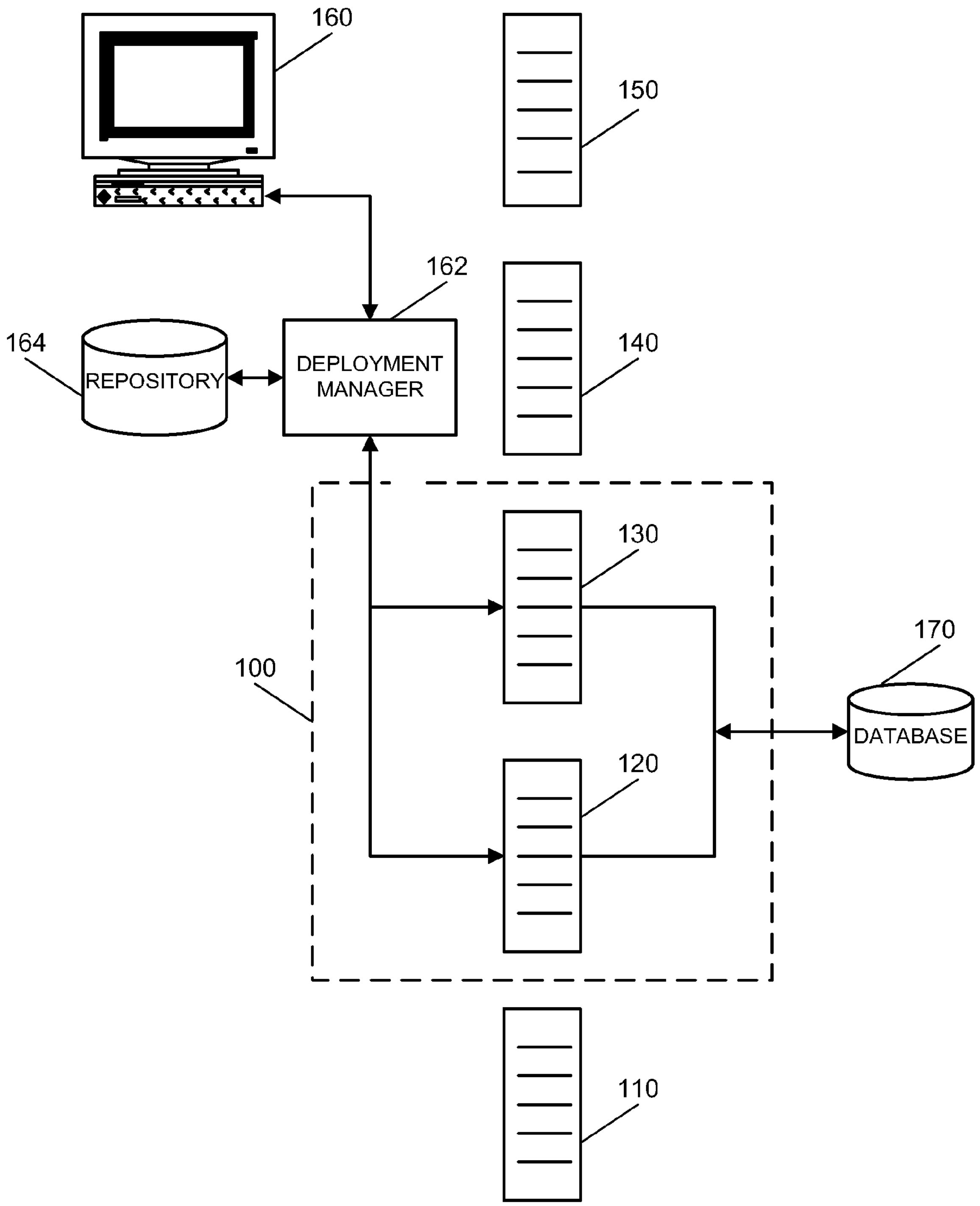
FIG. 1(*a*) depicts an exemplary bank of servers and cluster.
Figure 1B:
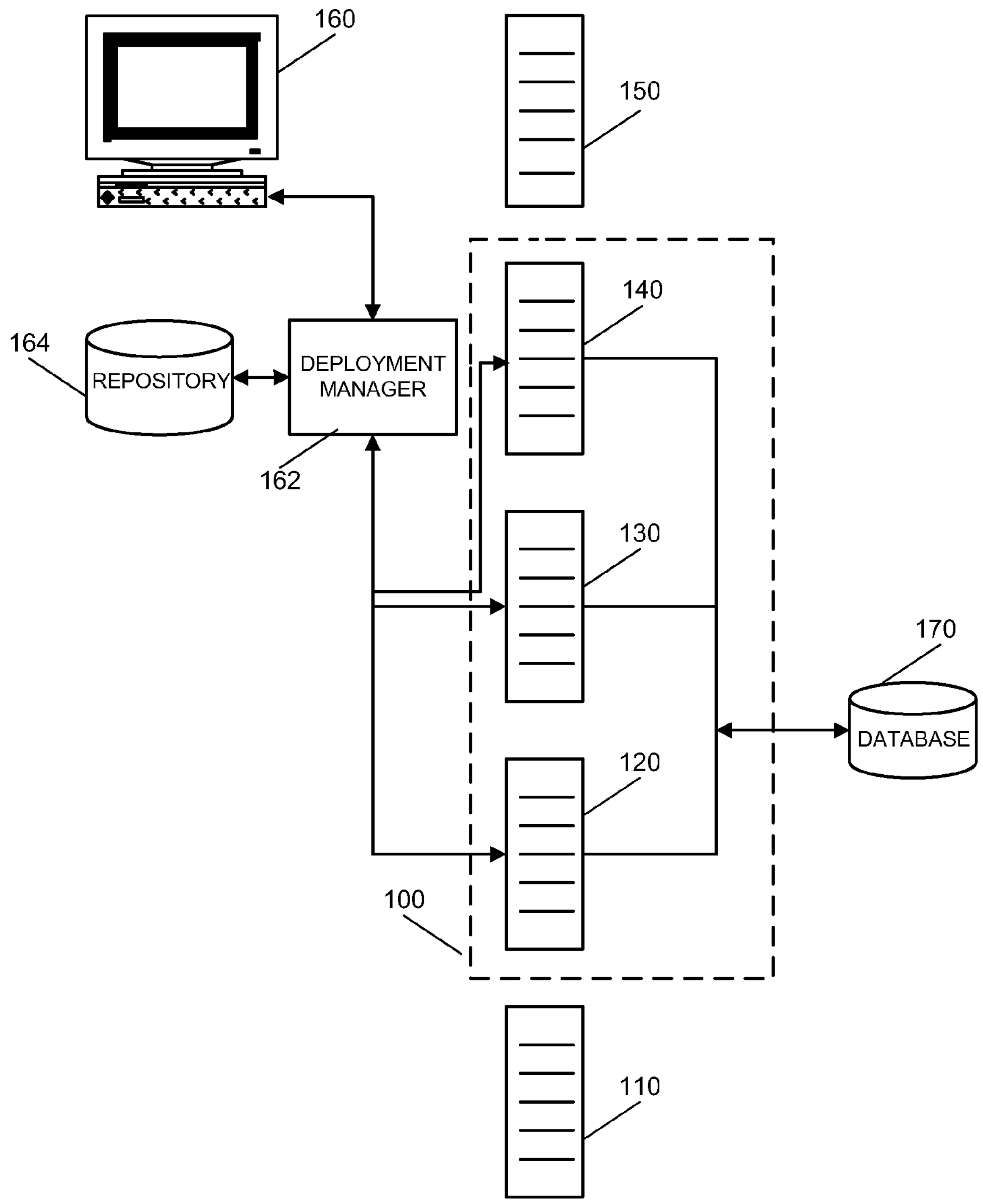
Figure 1C:
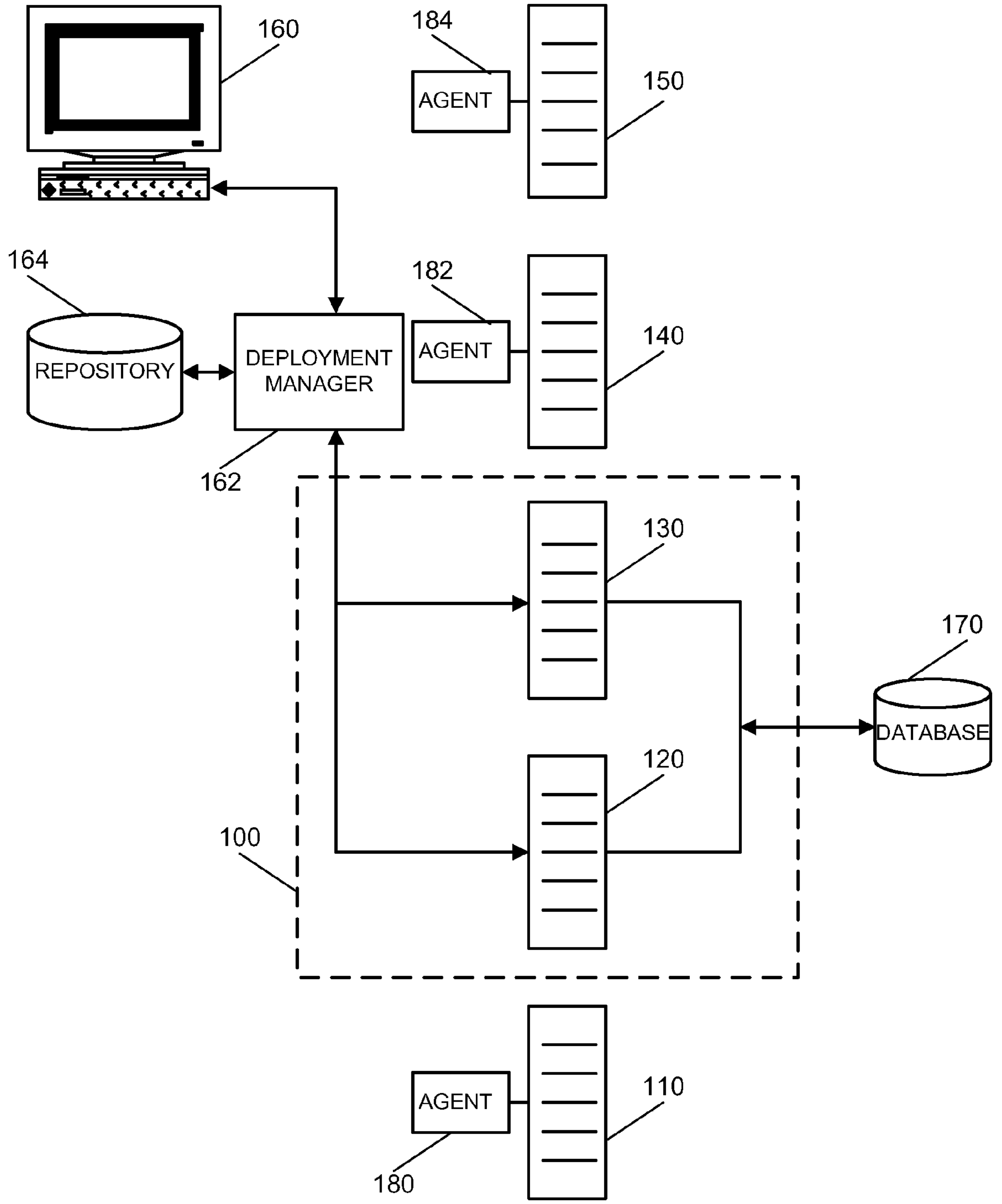

With reference now to the figures wherein like reference numerals identify like parts, FIG. 1(*a*) depicts an exemplary bank of servers. The bank of servers includes servers 110, 120, 130, 140 and 150. The servers 110, 120, 130, 140 and 150 may be rack-mounted, standalone servers or a combination thereof. Further the servers 110, 120, 130, 140 and 150 may make up a network of servers that are geographically distant from each other or close to each other or may be on totally disparate networks and joined together via the Internet.

Servers 120 and 130 are configured as a cluster 100 of servers with server 130 being $node_1$ and server 120 being $node_2$. A node usually corresponds to a physical computer system with a distinct Internet Protocol (IP) address. The cluster of servers is connected to database 170 that contains datafiles that are accessible to users via the cluster. The cluster 100 is also connected to deployment manager 162. Deployment manager 162 may be embedded in computer system 160 or be on a standalone server. Deployment manager 162 is controlled by an administrative console (not shown) in client 160. Deployment managers are administrative programs that provide a centralized management view for all nodes in a cluster and workload balancing of application servers across one or several nodes in a cluster. Data used to manage and configure the cluster may be stored in repository 164.

Note that cluster 100 is only an example of clusters that may be used with the invention and the components (e.g., servers 120 and 130) are not all inclusive. A cluster may have more than two nodes which all or part thereof can be each in a partition of a logically partitioned (LPAR) computer system or on different computer systems altogether. Further, in addition to the components shown in FIG. 1(*a*), a cluster may also include: (1) a node agent for managing the servers running on a node; (2) a cell which is a logical group of nodes that are combined to allow for a single point of administration; (3) a managed server which is an application server process running in its own Java Virtual Machine (JVM) that is part of a cell. Thus, the cluster 100 of FIG. 1(*a*) is not all encompassing and is used for illustrative purposes only.

The present invention provides a mechanism by which additional servers can be found on demand. The mechanism can dynamically expand the cluster 100 outside of the pre-defined pool of servers to manage heavy workloads. In a particular embodiment, the present invention may configure the cluster 100 in a manner whereby the cluster manager 162 can request new servers to commit for a certain number of transactions, or a certain number of hours of CPU time or "wall clock" time. Further, when and if the load reduces below a pre-defined threshold, additional servers that may have been added to the cluster 100 may be released.

In order to select a best-suited server to add to cluster 100 when needed, the cluster manager 162 keeps a history of additional servers that it has employed in the past along with their quality of service (i.e., performance, scalability, reliability etc.) in a table in repository 164. FIG. 2 illustrates an exemplary table in which additional resources cross-referenced with their quality of service are stored. According to the table, $server_1$, $server_2$ and $server_3$ have each been used at least once before by the present invention to maintain the performance of cluster 100. In this particular case, $server_1$ represents application server 110, $server_2$ represents application server 140 and $server_3$ represents application server 150 in FIG. 1(*a*).

According to an embodiment of the invention, when the workload on cluster 100 exceeds a user-configurable threshold, the deployment manager 162 may send a request for "volunteers" to the network of application servers (i.e., applications servers 110, 140 and 150) in FIG. 1(*a*). When the deployment manager 162 sends out the initial request for "volunteers", it can request information about current workload of the volunteer servers as well as their system information such as CPU information, memory, network capabilities etc. After waiting for a pre-configured amount of time, the deployment manager 162 will compare the response from responding systems to the data in the table in FIG. 2. Based upon past performance, availability and the current workload of the responding servers, the deployment manager 162 will choose the best one of the servers and add it to the cluster 100. Alternatively, the responding systems may scale themselves based upon a set of algorithm/heuristics and respond to the deployment manager 162 with their current capability to serve as an additional node to the deployment manager 162.

As an example, WebSphere™ clusters are usually planned when deployed. Suppose cluster 100 is a WebSphere™ cluster and an administrator pre-configures the cluster to run at a maximum of eighty percent (80%) capacity and/or to handle 10,000 transactions per second. If the load increases beyond either of these thresholds, it is an indication that performance will degrade.

Accordingly, when the load increases beyond either of the thresholds, the present invention will attempt to find more resources since all the servers (i.e., servers 120 and 130) in the cluster 100 are at maximum capacity. Thus, the deployment manager 162 will first broadcast a request to all systems on the network using a network protocol such as TCP/IP. In the broadcast request, the deployment manager 162 will solicit information from responding servers for information such as current and scheduled workload (including current CPU capacity), and performance characteristics such as I/O load, current memory usage, type of CPU, total memory, number of network cards, type of network cards etc.

The deployment manager 162 may then wait for a few seconds to allow solicited systems to respond. In this case, the solicited systems are servers 110, 140 and 150. After the deployment manager 162 collects information from all responding systems, the deployment manager 162 will look up the past history of the responding systems in the table in FIG. 2 to determine which one is best suited to be added to cluster 100.

Suppose, only servers 110 and 140 (i.e., $server_1$ and $server_2$, respectively, in FIG. 2) responded to the request. Provided current system usage conditions are the same for both servers 110 and 140, then server 140 will be chosen since its performance level was at seventy per cent (70%) the last time it was used. Consequently, the deployment manager 162 would add server 140 to the cluster 100 as shown in FIG. 1(*b*). In the case where only servers 110 and 150 (i.e., $server_1$ and $server_3$, respectively, in FIG. 2) responded to the request, the deployment manager 162 would choose server 110 to add to the cluster 100 since although the performance level of server 150 is the same as that of server 110, server 150 is not as reliable and scalable as server 110.

In any case, the list of servers in the table has a ranking based upon past performance in order to facilitate server selection. To maintain a favorable rating, a server must have been reliable, and have executed tasks with reasonably good performance. As alluded to above, if the deployment manager 162 finds a responding system in the list with the highest ranking in the table, the deployment manager 162 will pick that system as its additional node. If there is not a responding system with the highest ranking in the table then the next highest ranking system in the list that has responded to the request will be chosen as the additional server to the cluster 100 and so on.

If no previously used servers responded, the deployment manager 162 will then try one or all the new servers that responded. For example, suppose the bank of servers included an additional server (e.g., server A which is not shown), based on the entries in the table it could be surmised that the server A had not yet been used as an addition to cluster 100 otherwise an entry for server A would be in the table.

Thus, if only server A responded to the volunteer request, the deployment manager 162 would add server A to cluster 100. However, the deployment manager 162 would only assign small tasks (or trial tasks) at first to server A. If, based on the trial tasks, the response time and performance of server A are satisfactory, bigger tasks (i.e., tasks requiring high performance throughput) would ten be assigned to server A.

Note that in cases where the deployment manager 162 does not think that the heavy (or spike in) workload can be handled by the addition of a single server, a plurality of servers may be added. In such cases, the top-ranked n of the responding servers may be added to the cluster 100, where n is the number of servers that the deployment manager 162 estimates that is needed to handle the spike in workload. In this case, the deployment manager 162 can determine n by summing quality of service (QoS) data of the top-ranked servers until the load can be sufficiently handled.

In another embodiment of the invention, one or more benchmarking tasks may be assigned to servers 110, 140 and 150, with returned results such as CPU, memory capacity, network bandwidth, etc. measured over short and long periods of time (e.g., 1 hour, 24 hours, 7 days) in order to compile heuristics data that may be stored into a table such as the one in FIG. 2. The heuristics data can be supplemented and refined as the experience of the deployment manager 162 with each node grows.

If there is a plurality of clusters on a network, each server or deployment manager outside of a requesting cluster may have an agent that listens to requests issued by the deployment manager of the requesting cluster. In FIG. 1(*c*), these agents are shown as agents 180, 182 and 184 attached to servers 110, 140 and 150, respectively. If a system is available to assist a requesting deployment manager, the system may negotiate the time and/or number of transactions it can commit to with the requesting deployment manager. The requesting deployment manager may then pull in the resource into the cluster temporarily, and monitor the performance of the system. When the system/resource is released, the deployment manager may log into the heuristics data an assessment of the system reliability and performance and assign a rating according to the performance and availability of the system. To measure some of these parameters, the deployment manager may use a system monitoring tool such as Tivoli Monitoring, a product of IBM. (IBM Tivoli Monitoring is an enterprise-level monitoring tool that uses a Web-based (IP) approach allowing for a proactive monitoring and repair capability.)

Figure 3A:
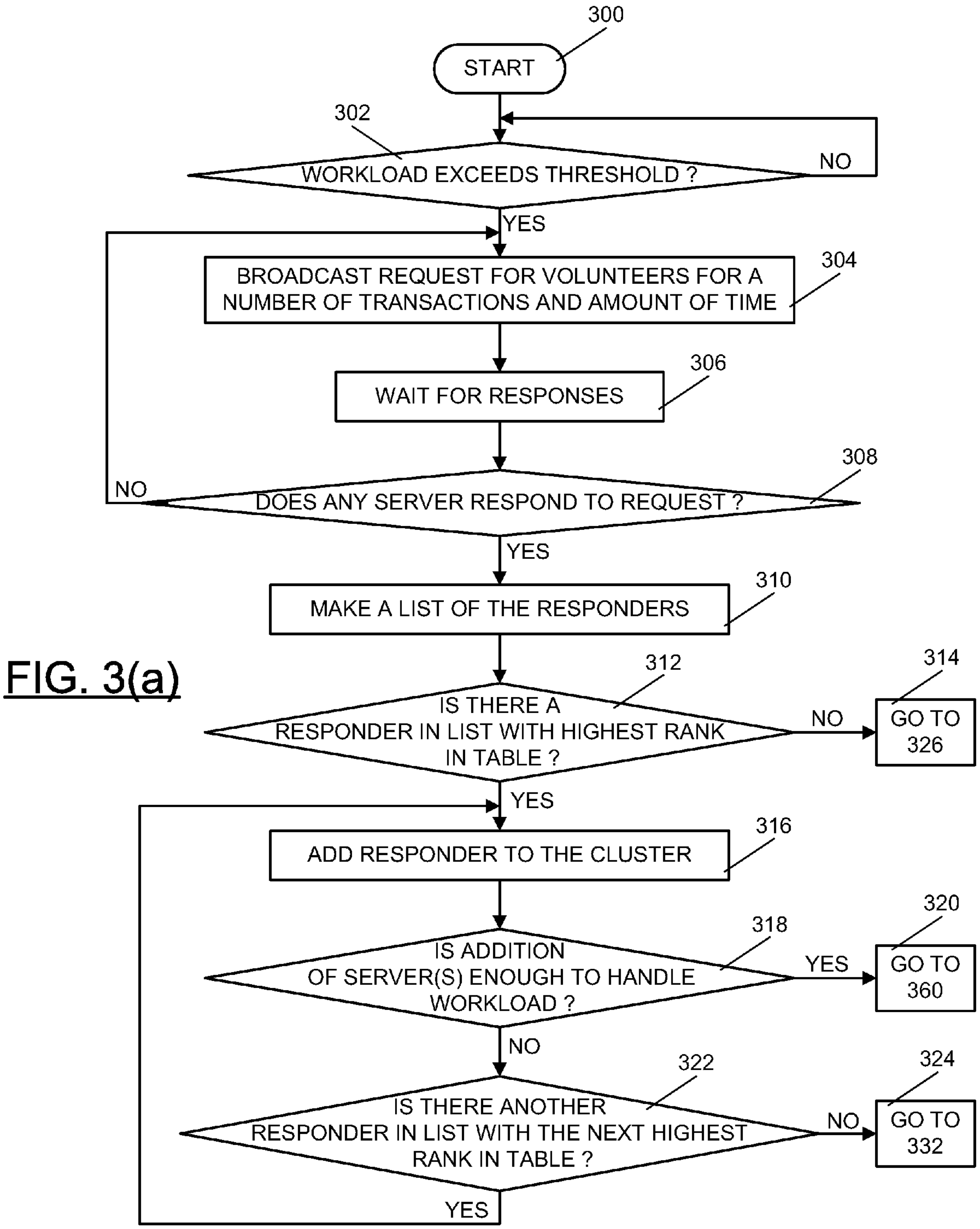
FIGS. 3(*a*), 3(*b*) and 3(*c*) form generic FIG. 3 which is a flowchart of a process that may be used to implement an exemplary embodiment of the present invention.
Figure 3B:
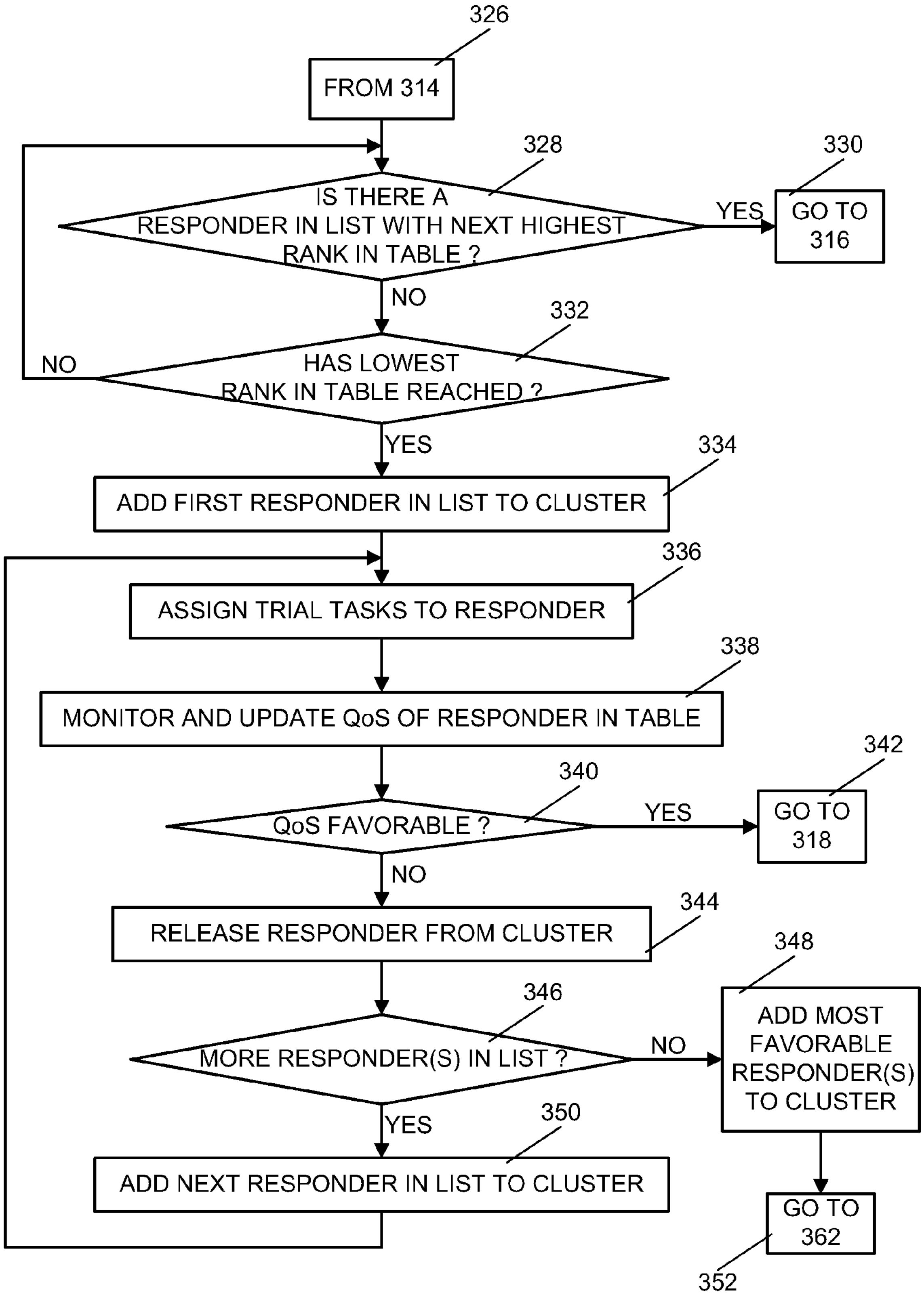
Figure 3C:
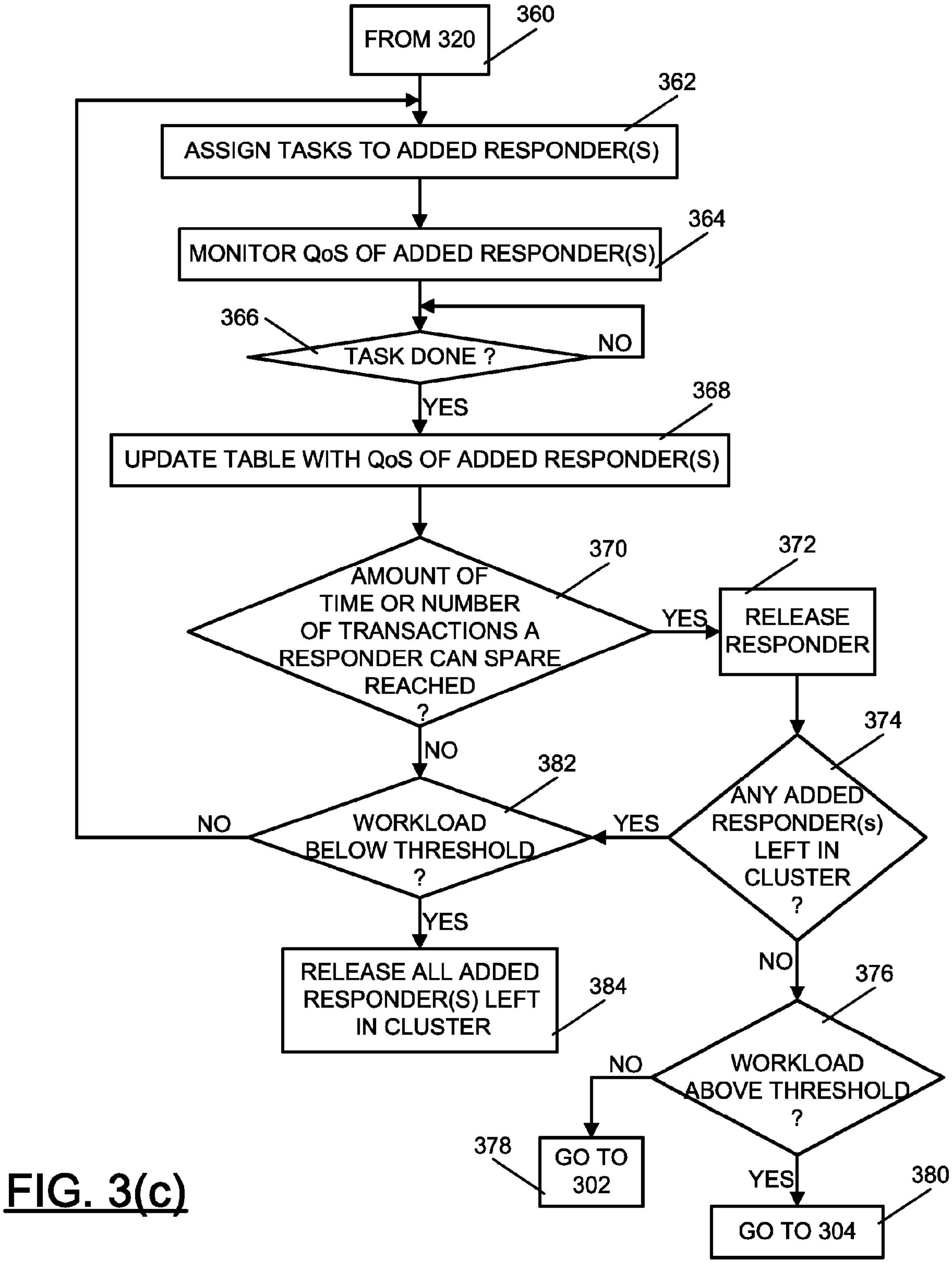

FIGS. 3(*a*), 3(*b*) and 3(*c*) will be referred generically as FIG. 3. FIG. 3 is a flowchart of a process that may be used to implement an exemplary embodiment of the present invention. The process starts when the system on which the deployment manager 162 executes is turned on or is refreshed (step 300). A check is then continuously made to determine whether the workload on the cluster 100 exceeds either one of the thresholds mentioned above (step 302). If so, a request for volunteer systems to donate a certain number of transactions for a certain amount of time is broadcasted (step 304). After a certain amount of time has elapsed since the broadcast (step 306), a check is made to determine whether any of the servers responded to the request (step 308). If none responded, the process jumps back to step 304.

If at least one server responded, a list is constructed into which the responders (i.e., servers) are added (step 310). A check is then made to determine if any responder on the list has the highest ranking in the table of FIG. 2 (step 312). If there is not a responder in the list that has the highest ranking in the table, the process jumps forward to step 326 (see step 314). If, on the other hand, there is a responder in the list with the highest ranking in the table, the responder is added to the cluster 100 (step 316).

After adding the responder to the cluster 100, a check is made to determine whether any additional servers are needed to handle the spike in workload (step 318). If not, the process will jump forward to step 360 (see step 320). If more servers are needed to handle the spike in workload, then another check will be made to determine whether there is another responder in the list that has the next highest ranking in the table (step 322). If not, the process will jump forward to step 332 (see step 324). If there is another responder with the next highest ranking in the table in the list, the process will jump back to step 316 where that responder will be added to the cluster 100.

From step 314 (see step 326 in FIG. 3(*b*)), a check is made to determine if there is a responder in the list with the next highest ranking in table (step 328). If there is one, the process will jump back to step 316 for the responder to be added to the cluster. If there is not a responder with the next highest ranking, another test is made to determine whether the lowest ranking in the table has been reached (step 322). If not, the process will jump back to step 328.

If the lowest ranking in the table has been reached, the first responder (without a ranking) in the list is added to the cluster (step 334). Then, trial tasks are assigned to the responder (step 336). The QoS of the responder is monitored and added to the table (step 338). After adding the QoS of the added responder to the table, in step 340 a check is made to determine whether the QoS of the responder is favorable (i.e., good scalability, reliability and performance level). If the QoS of the added responder is favorable, the process jumps back to step 318 (see step 342). If, on the other hand, the QoS of the added is not favorable, the responder is released from Cluster 100 (step 344). If there are more responders (without ranking) in the list, the next responder in the list is added to cluster 100 and the process jumps back to step 336 (steps 346 and 350). If there is not any more responder (without ranking) in list, the most favorable responder among all that were tried is added to the cluster 100 before the process jumps to step 362 (steps 346, 348 and 352).

Note that if more than one responder is needed to handle the spike in workload, the topmost favorable n responders will be added to the cluster 100, provided of course that n servers responded to the request. In this case, n is the number estimated by the deployment manager 162 needed to handle the workload.

From step 320 (see step 360 in FIG. 3(*c*)) the process goes to step 362 where tasks are assigned to the added responder(s). As the tasks are being performed, the QoS of the responder(s) is monitored (step 364). After the task has been performed, the table is updated with the QoS of each added responder (step 368). After updating the table, a check is made to determine whether the amount of time and/or number of transactions each responder can spare has been reached (step 370). If the amount of time and/or number of transactions a responder can spare is reached, the responder is released from the cluster 100 (step 372).

After releasing all responders that have reached the amount of time and/or number of transactions that they can spare, a check is made to determine whether any added responder is left in the cluster 100 (step 374). If no added responder is left in the cluster, another check is made to determine whether the workload is above the threshold set by the administrator (step 376). If the workload is not above the threshold, the process jumps back to step 302 (see step 378); otherwise, the process jumps back to step 304 (see step 380).

If there is any added responder left in the cluster 100, another check is made to determine whether the workload is below the threshold set by the administrator (step 382). If the workload is not below the threshold, the process will jump back to step 362. If, one the other hand, the workload is below the threshold, all added responder(s) will be released (step 384).

Generally, the first time the table is ever used to find a server that is well suited as an addition to a cluster, the table will be empty. However and as mentioned above, instead of starting with an empty table, benchmarking tasks may be assigned to the servers in order to compile heuristics data that may be stored into a table such as starting information.

In any event, the invention can take the form of a computer program product accessible from a computer-usable or computer-readable medium providing program code for use by or in connection with a computer or any other instruction execution system. For the purposes of this description, a computer-usable or computer readable medium can be any tangible apparatus that can contain, store or transport the program for use by or in connection with the instruction execution system, apparatus, or device.

The medium can be an electronic, magnetic, optical, electromagnetic or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and Digital VideoNersatile Disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Figure 4:
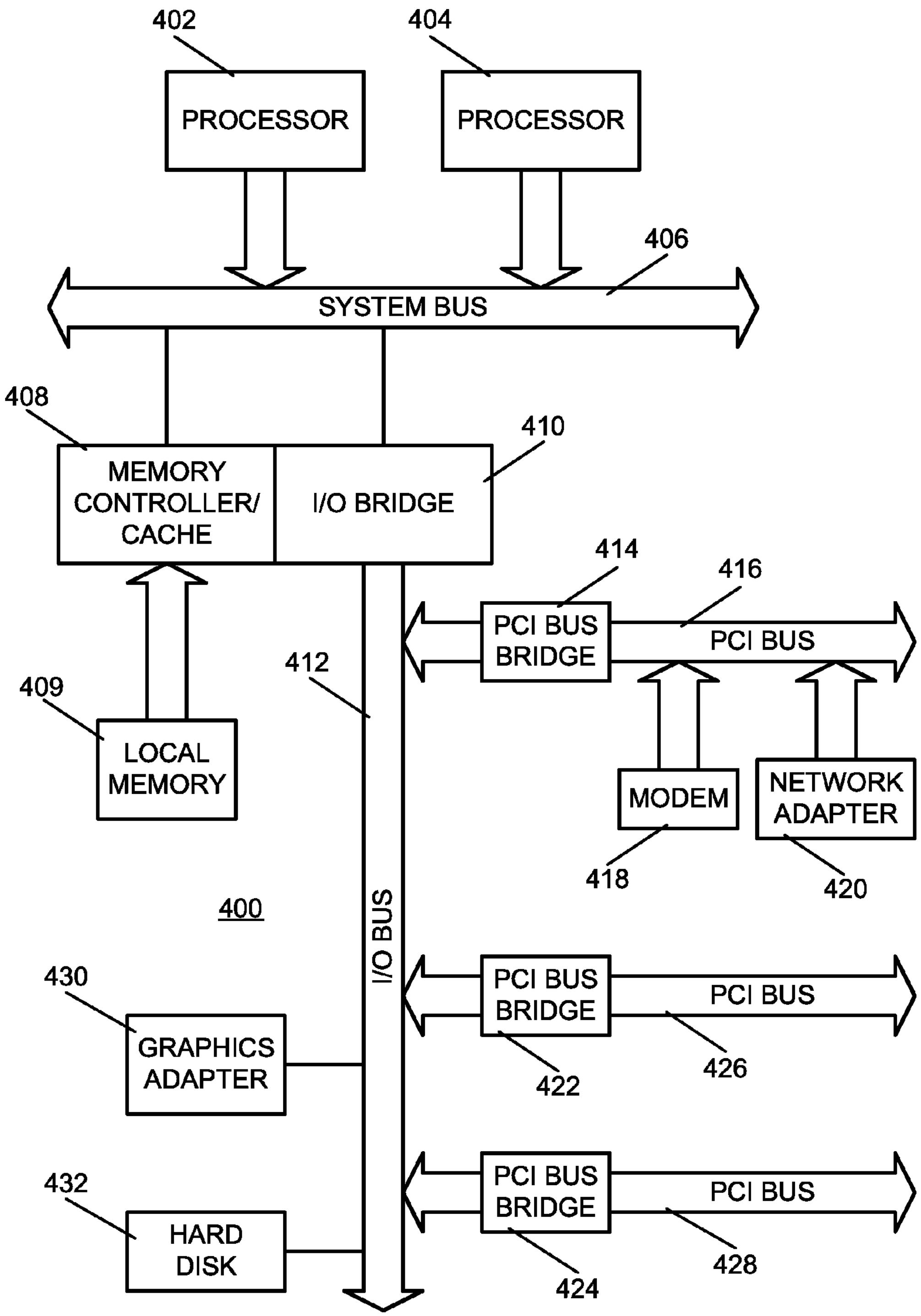
FIG. 4 is a block diagram of a data processing system that may be implemented as a server.

FIG. 4 is a block diagram of a data processing system that may be implemented as a server, such as servers 110, 120, 130, 140 and 150 in FIG. 1. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to client 160 in FIG. 1 may be provided through modem 418 and network adapter 420 connected to PCI local bus 416 through add-in boards. Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM e-Server pSeries system, a product of International Business Machines Corporation in Armonk, N.Y., running the Advanced Interactive Executive (AIX) operating system or LINUX operating system.

Figure 5:
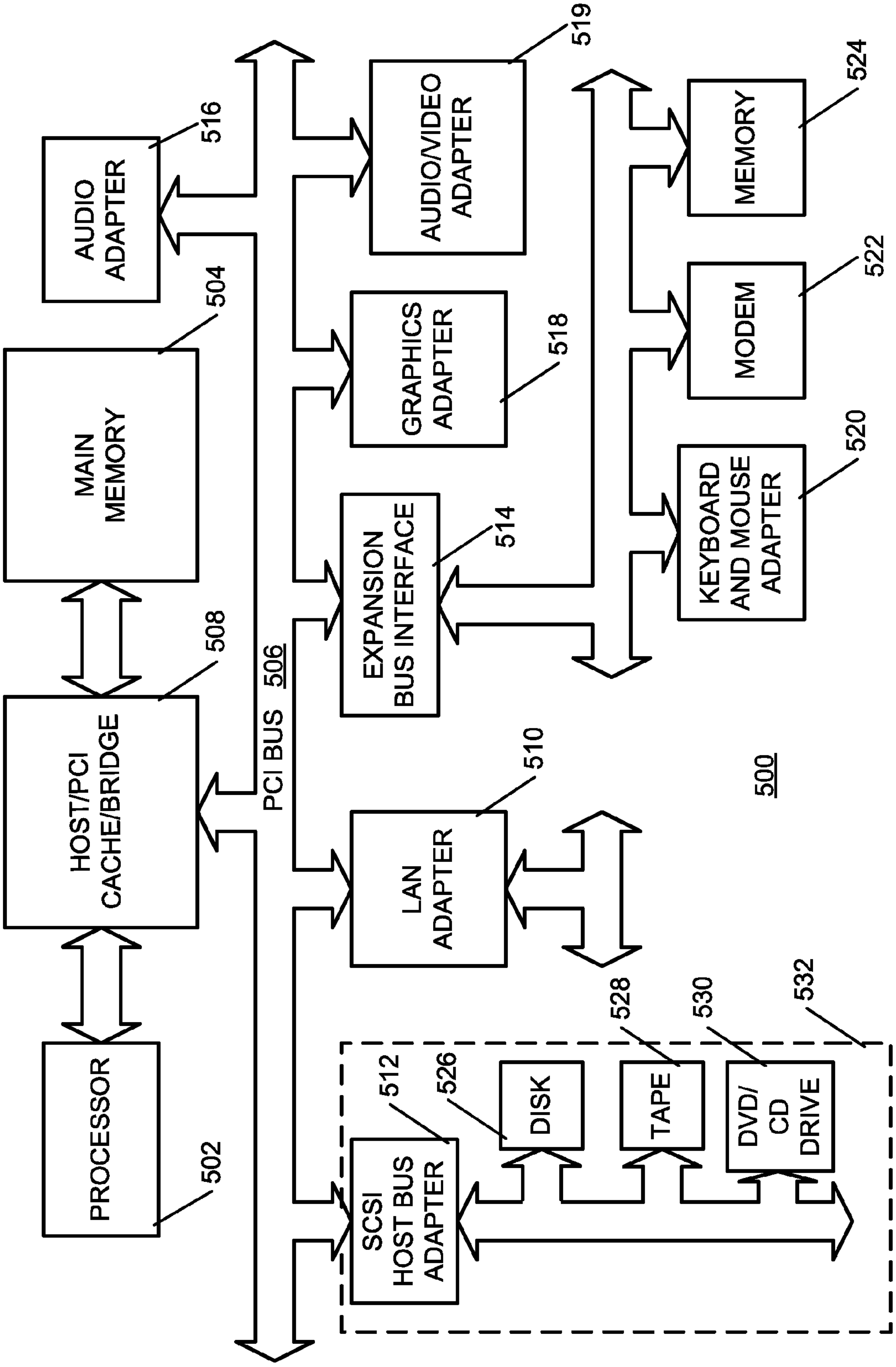
FIG. 5 is a block diagram of a data processing system that may be implemented as a client.

With reference now to FIG. 5, a block diagram illustrating a client system such as system 160 is depicted. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, Small computer system interface (SCSI) host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, and CD-ROM drive 530. Typical PCI local bus implementations will support three or four PCI expansion slots or add-in connectors as shown by local PCI expansion slot 532.

An operating system runs on processor 502 and is used to coordinate and provide control of various components within data processing system 500 in FIG. 5. The operating system may be a commercially available operating system, such as Windows XP®, which is available from Microsoft Corporation. An object oriented programming system such as Java may run in conjunction with the operating system and provide calls to the operating system from Java programs or applications executing on data processing system 500. "Java" is a trademark of Sun Microsystems, Inc. Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

As another example, data processing system 500 may be a stand-alone system configured to be bootable without relying on some type of network communication interface, whether or not data processing system 500 comprises some type of network communication interface. As a further example, data processing system 500 may be a Personal Digital Assistant (PDA) device, which is configured with ROM and/or flash ROM in order to provide non-volatile memory for storing operating system files and/or user-generated data.

The depicted example in FIG. 5 and above-described examples are not meant to imply architectural limitations. For example, data processing system 500 may also be a notebook computer or hand held computer as well as a PDA. Further, data processing system 500 may also be a kiosk or a Web appliance.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application and to enable others of ordinary skill in the art to understand the invention for various embodiments with various modifications as are suited to the particular use contemplated.

What is claimed is:

1. A computer-implemented method of dynamically adding an application server to a cluster of application servers comprising:

maintaining a history of quality of service (QoS) for each of a plurality of application servers;

broadcasting a request to the application servers to identify one or more application servers able to donate a number of processor cycles for an amount of time to the cluster;

dynamically selecting, based on the history of QoS and responses corresponding to the one or more application servers identified by the broadcasting, an application server to add to the cluster when the cluster is under a heavy workload; and dynamically adding the selected application server to the cluster.

2. The computer-implemented method of claim 1 wherein when two or more application servers respond to the request within a particular time frame, the application server with a most favorable history of QoS is selected.

3. The computer-implemented method of claim 2 wherein if none of the application servers that respond to the request has a history of QoS, the first application server to respond within the particular time frame is added to the cluster.

4. The computer-implemented method of claim 3 wherein a heavy workload is a workload that exceeds a user-configurable threshold.

5. The computer-implemented method of claim 4 wherein when the workload no longer exceeds the user-configurable threshold and the added application server is not performing a task for the cluster, the added application server is released from the cluster.

6. The computer-implemented method of claim 5 wherein when the added application server is released from the cluster, the history of QoS of the added application server is updated.

7. A computer program product on a tangible computer readable medium for dynamically adding an application server to a cluster of application servers comprising:

code means for maintaining a history of quality of service (QoS) for each of a plurality of application servers;

code means for broadcasting a request to the application servers to identify one or more application servers able to donate a number of processor cycles for an amount of time to the cluster;

code means for dynamically selecting, based on the history of QoS and responses corresponding to the one or more application servers identified by the broadcasting, an application server to add to the cluster when the cluster is under a heavy workload; and code means for dynamically adding the selected application server to the cluster.

8. The computer program product of claim 7 wherein when two or more application servers respond to the request within a particular time frame, the application server with a most favorable history of QoS is selected.

9. The computer program product of claim 8 wherein if none of the application servers that respond to the request has a history of QoS, the first application server to respond within the particular time frame is added to the cluster.

10. The computer program product of claim 9 wherein a heavy workload is a workload that exceeds a user-configurable threshold.

11. The computer program product of claim 10 wherein when the workload no longer exceeds the user-configurable threshold and the added application server is not performing a task for the cluster, the added application server is released from the cluster.

12. The computer program product of claim 11 wherein when the added application server is released from the cluster, the history of QoS of the added application server is updated.

13. A computer system for dynamically adding an application server to a cluster of application servers comprising:

at least one storage device for storing code data; and at least one processor for processing the code data to:

maintain a history of quality of service (QoS) for each of a plurality of application servers;

broadcast a request to the application servers to identify one or more application servers able to donate a number of processor cycles for an amount of time to the cluster;

dynamically select, based on the history of QoS QoS and responses corresponding to the one or more application servers identified by the broadcast, an application server to add to the cluster when the cluster is under a heavy workload and dynamically add the selected application server to the cluster.

14. The computer system of claim 13 wherein when two or more application servers respond to the request within a particular time frame, the application server with a most favorable history of QoS is selected.

15. The computer system of claim 14 wherein if none of the application servers that respond to the request has a history of QoS, the first application server to respond within the particular time frame is added to the cluster.

16. The computer system of claim 15 wherein a heavy workload is a workload that exceeds a user-configurable threshold.

17. The computer system of claim 16 wherein when the workload no longer exceeds the user-configurable threshold and the added application server is not performing a task for the cluster, the added application server is released from the cluster.

* * * * *